United States Patent

[11] 3,615,477

| | | |
|---|---|---|
| [72] | Inventor | John A. Mattor<br>Bar Mills, Maine |
| [21] | Appl. No. | 819 |
| [22] | Filed | Jan. 5, 1970 |
| [45] | Patented | Oct. 26, 1971 |
| [73] | Assignee | Scott Paper Company<br>Delaware County, Pa. |

[54] PHOTOSENSITIVE MATERIAL COMPRISING A FURFURYLIDENE, A LOWER HALOALKANE AND A 2,5-DIALKOXYANILINE
10 Claims, No Drawings

[52] U.S. Cl. .................................................. 96/48, 96/90
[51] Int. Cl. .................................................. G03c 5/24, G03c 1/72
[50] Field of Search ........................................ 96/48, 90

[56] References Cited
UNITED STATES PATENTS

| | | | |
|---|---|---|---|
| 3,394,392 | 7/1968 | Mattor .......................... | 96/90 |
| 3,394,395 | 7/1968 | Mattor et al. ................. | 96/90 |

Primary Examiner—Norman G. Torchin
Assistant Examiner—Richard Fichter
Attorneys—Willaim J. Foley, Stanton T. Hadley, John W. Kane, Martin L. Faigus and John A. Weygandt ABSTRACT: A heat developable photographic plate which comprises, on a support, a layer of a binder containing dissolved therein: as a color former, a furfurylidene compound; as a sensitizer, a lower haloalkane; and as an enhancer, a 2,5-dialkoxyaniline; and which is capable of forming, after exposure to light, dense, black images at temperatures in excess of 150° C.

3,615,477

PHOTOSENSITIVE MATERIAL COMPRISING A FURFURYLIDENE, A LOWER HALOALKANE AND A 2,5-DIALKOXYANILINE

BACKGROUND OF THE INVENTION

1. Field of the Invention

This invention relates to photosensitive materials. More particularly, it relates to a negative-working, thermally developable and fixable photographic plate comprising, on a support, a light-passing resinous binder containing dissolved therein a purified furfurylidene compound, a primary aromatic amine and a photosensitive lower haloalkane.

2. History of the Prior Art

In U.S. Pat. No. 3,394,395 granted July 23, 1968, there is disclosed and claimed a photographic medium consisting essentially of a transparent to translucent plastic film containing dissolved therein a furfurylidene compound as the color-forming ingredient, a primary aromatic amine enhancer, and a lower haloalkane sensitizer e.g. iodoform. The photographic medium is negative working and is usually carried as a film on a support thereby forming a photographic plate. Permanently black or colored images can be produced by the process disclosed therein by short exposures of the photographic medium to light directed through an image-containing transparency. An unusual feature is that no chemical treatment is required to develop the image or to desensitize the unexposed or background areas. All that is required to develop the image is to heat the medium briefly to about 100°–150° C.

When, however, an image formed in a photographic medium prepared from a composition specifically described in U.S. Pat. No. 3,394,395 and under the exposure and development conditions described therein is subjected to temperatures substantially in excess of 150° C., the color of the image is degraded and there is a loss of image density. After exposure to light for the relatively brief periods disclosed in said patent, no photographic medium specifically disclosed therein is capable of being developed and fixed at temperatures in excess of 150° C. to form a dense, black image. It would be desirable to be able to develop and fix the image at temperatures in excess of 150° C. in order to reduce the time required for the development step while retaining the relatively brief exposure times disclosed in U.S. Pat. No. 3,394,395. Although rapid development at temperatures in excess of 150° C. can be employed with the photographic media specifically disclosed in said patent, prolonged exposure to light during the imaging step is required to produce black images upon development. It is further desirable to reduce the criticality of temperature control in the heating element during development and fixation.

SUMMARY OF THE INVENTION

Accordingly, it is an object of the present invention to provide a heat developable photographic plate capable of forming a dense black image after exposure to light, at temperatures in excess of 150° C., wherein the plate comprises, on a support, a layer of a light-passing binder containing dissolved therein; as a color former a purified furfurylidene compound; as a sensitizer, a photosensitive lower haloalkane; and as an enhancer, a primary aromatic amine.

Another object of the invention is to provide a plate of the type described above which is capable of forming an image which is stable in the presence of heat and light.

It has now been found that within the class of amines consisting of primary aromatic monoamines containing a single, substituted-benzene ring, such amines usually being characterized by the formation of red or purple images under the operating conditions and employing the photosensitive formulations described in U.S. Pat. No. 3,394,395, there also exists a narrow class of amines which produces blue-black images under the exposure and development conditions of said patent and which are unexpectedly capable of forming dense black images when developed at temperatures from about 150° C. up to the thermal degradation point of the support. These unique amines are the 2,5-dialkoxyanilines.

A further unexpected characteristic of a photographic medium prepared in accordance with said patent but containing a 2,5-dialkoxyaniline as an enhancer is that, upon exposure to light, a strong image of a green color appears. While the printout image becomes indistinct after extended exposure to actinic light (as the still sensitive material in the background areas gradually becomes exposed), it is nonetheless useful for previewing or proofing the image and will in some cases provide enough information to obviate the need for heat developing the image. The readily visible printout images may be employed to obtain proper register of different print areas in cases where multiple exposure is desired.

In a particularly surprising embodiment of the present invention, it has been discovered that photographic coating compositions of the type contemplated by the present invention, when employed with polysulfone as the resinous binder, not only produce a highly visible printout image upon exposure to light, but also, if the exposure is abbreviated and if development is carried out at a temperature which does not greatly exceed 150° C., the image retains its green color upon development and fixation. The result is a stable green image. Thus, the possibility of two-tone proofing is afforded.

By way of example, the registry of the images in two lithographic negatives to be used for preparing plates for two-color printing can be checked in the following manner. A photographic plate of the present invention is exposed to a transparency containing an image of a first tone or color for a time sufficient to produce a black image upon development. Then the plate is exposed to another transparency containing an image of a second tone or color for a briefer time whereby the green printout image will be retained after development. A "proof" of the two-color image is obtained by developing the plate at, for example, about 150° C. The first color appears as black in the areas exposed first for the longer duration and the second color appears as green in the areas exposed second for the shorter duration.

Another advantage of the present invention results from the fact that not only is a dense image formed at high temperatures, but the image apparently contains free carbon, because the plate is useful as a master in thermographic copying systems such as Thermofax or Prestofax.

Inasmuch as the images formed on photographic plates containing 2,5-dialkoxyanilines can be developed at temperatures such as 200° C., they may be characterized as exceptionally stable in the presence of heat and light. In addition, none of the other photographically desirable characteristics of the basic system disclosed in U.S. Pat. No. 3,394,395 are sacrificed by use of 2,5-dialkoxyanilines. Plates in accordance with the present invention exhibit a shelf life prior to exposure at least equal to that shown by any of the previous plates of this type, with regard to both premature reaction and loss of image density upon exposure. Furthermore, as will be more specifically described hereinafter, the plates of the invention can be exposed, developed and fixed in substantially less time than previous plates of the same type. In addition, the photographic coating compositions of the present invention are readily soluble in a great variety of organic solvents and combinations of such solvents.

The unexpectedness of producing black images from formulations containing 2,5-dialkoxyanilines is illustrated in the following table which describes various other alkoxy, alkyl and halo-substituted anilines and the images which result when a photosensitive layer containing each is developed below 150° C. and above 150° C. In each case, to a solution consisting of 1.0 part by weight difurfurylidene pentaerythritol, 2.0 parts iodoform, 10 parts polyphenylene oxide (General Electric), and 150 parts chloroform was added 2.0 parts of each of the amines given in the table. The solution was applied by means of a No. 20 Mayer rod to one side of paper treated with polyvinyl alcohol to repel the solvent, and dried. The plate was exposed using a 2.25 kv.-a. (kilovolt-amp) carbon arc lamp at a distance of 52 centimeters for 20 seconds. The density of the resulting image in each case was measured under the same conditions and by the same Welch densitometer.

TABLE 1

| Enhancer | Developing Temp. 140° C | | Developing Temp. 190° C | |
| --- | --- | --- | --- | --- |
| | Image Color | Density | Image Color | Density |
| 4-methoxyaniline | Red | 1.12 | Brown | 0.73 |
| 4-ethoxyaniline | Red | 1.25 | Brown | 0.68 |
| 4-methylaniline | Red | 0.85 | Brown | 0.58 |
| 3-methoxyaniline | Red | 1.43 | Brown | 1.00 |
| 4-chloroaniline | Red | 0.84 | Brown | 0.54 |
| 4-methylmercaptoaniline | Purple | 1.73 | Brown | 0.80 |
| 2-methyl, 4-methoxyaniline | Red | 0.74 | Brown | 0.60 |
| 2,4-dimethoxy 6-chloroaniline | Purple | 1.11 | Brown | 0.76 |
| 2,5-dimethoxyaniline | Blue-Black | 1.33 | Black | 1.86 |
| 2,5-diethoxyaniline | Blue-Black | 1.34 | Black | 1.88 |
| 2,5-diisopropoxyaniline | Blue-Black | 1.28 | Black | 1.70 |

Thus, it may be seen from the table that while many other types of anilines, including other alkoxy anilines, produce red or purple images of good density when developed at a temperature within the range recommended in U.S. Pat. No. 3,394,395, when the developing temperature is raised to 190° C., the color is degraded to brown and image density is reduced. The 2,5-dialkoxyanilines, on the other hand, produce blue-black images of good density when developed at a temperature within the range recommended in said patent, but when the developing temperature is raised to 190° C., the image becomes black and the density actually increases.

DETAILED DESCRIPTION

The 2,5-dimethoxy- and 2,5-diethoxyanilines are commercially available from several manufacturers and need only be purified by distillation or recrystallization for use in the present invention. Any of the other 2,5-dialkoxyanilines, such as 2,5-diisopropoxyaniline, can be prepared in accordance with known techniques, by alkylating hydroquinone, nitrating the resulting ether and finally reducing the nitrated ether to form the amine.

In general, the haloalkane sensitizer used in the present invention is a solid at room temperature and has a purity of at least 98 percent. Compounds containing one to two carbon atoms, such as iodoform and pentabromethane, are preferred. The furfurylidene color former is usually prepared by reacting furfural with a suitable amine, in the case of the furfurylidene imines, and with a suitable glycol or higher polyol, in the case of the cyclic acetals. Conventional organic synthesis techniques are used, as more fully described in U.S. Pat. No. 3,394,395.

The furfurylidene color former, the amine enhancer and the haloalkane sensitizer are applied to a suitable support in solvent solution along with a film-forming plastic polymer. Any one of several suitable organic solvents that are volatile at room temperature or at slightly elevated temperatures can be used such as chloroform; benzene; 1,1,2 trichloroethane and methyl ethyl ketone. Mixtures of the solvents can be used to obtain improved solvation. The film-forming plastic should be essentially nonreactive with the other ingredients of the solution and desirably in the free state forms a translucent or transparent film that is colorless or substantially colorless so as not to interfere with or mask the color produced by the other ingredients in the photographic medium. Some polyester polymers have been found to be unsatisfactory presumably because the hydrogen iodide attacks the ester linkage. The polymer should be unaffected by concentrated aqueous solutions of hydrogen iodide at 25° C. In most cases it is desirable for the polymer to form a nontacky film. Preferred polymer film formers or binders include polyphenylene oxide and polysulfone.

The weight ratio of primary aromatic amine enhancer to the furfurylidene color former is usually in the range of 0.1 to 4, preferably 0.5 to 1.5. The weight ratio of haloalkane sensitizer to color former is in the range of 0.1 to 20, preferably 0.5 to 2. The weight ratio of resin to color former is not too important. It will usually be in the range of 1 to 40, with the lower ratios below about 5 being preferred from the standpoint of intensity and economics. The coating solids used will normally be in the range of 10 to 20 percent. A photographic plate is prepared from the coating solution by applying it to a suitable support by conventional means to produce, upon drying, a coating weight of 3 to 15 g./m.$^2$ or a film thickness of 1 to 10 microns. Other things being equal, the thicker the film, the more intense the image.

The support used in the preparation of a photographic plate may require a coating on its surface to prevent the penetration of organic solvents. In the case of paper, starch and potassium polyacrylate resins and similar binders will accomplish this function. In general, water soluble resins that are film formers can be expected to give adequate solvent holdup. In the case of transparent supports, films of polyethylene terephthalate resin (DuPont's Mylar) have proved to be excellent supports and particularly suitable for the preparation of films for microphotographic copying. In cases where transparent supports are not desired, any impermeable, inert support such as aluminum, sheet steel, glass, etc. may be employed.

These and other principles, features and advantages of the present invention will become more fully understood from a consideration of the following specific examples.

EXAMPLE I

A photographic plate was prepared from a coating solution comprising:

| | Parts by Weight |
| --- | --- |
| polysulfone resin (Union Carbide's P-1700) | 24.0 |
| difurfurylidene pentaerythritol | 3.0 |
| iodoform | 4.0 |
| 2,5-dimethoxyaniline | 3.0 | dissolved in an amount of a solvent consisting of 60 percent by volume methylene chloride and 40 percent by volume trichloroethylene sufficient to form a solution having 15 percent solids by weight. The solution was applied in an amount equal to 6 g./m.$^2$ by dry weight to each side of a suitably barrier-coated paper sheet, and dried. The plate was exposed through a negative transparency using a 2.25 kv.-a. (kilovolt-amp) carbon arc at a distance of 50 cm. for 90 seconds, whereby a vivid green image was formed. Heat development at 200° C. for 20 seconds produced a dense, black image of excellent stability.

EXAMPLE II

A photographic plate was prepared exactly as in example I and exposed as follows to a pair of lithographic negatives: the photographic plate was exposed through a first negative using a 2.25 kv.-a. carbon arc at a distance of 50 cm. for 90 seconds. The image produced in the exposed areas was dark green. A second negative was registered on the printout image resulting from the exposure of the first negative. The plate was then exposed through this second negative under the same exposure conditions used for the first negative except that exposure time was 6 seconds. The newly exposed areas resulting from this short exposure to the second negative were light green. The areas previously exposed under the first negative had been covered by the opaque areas of the second negative, and thus their dark green color was unaffected by the second exposure.

Upon development at 150° C. for 20 seconds, the light green color of those plate areas subjected to the brief, 6-second exposure through the second negative was substantially unchanged. However, those areas of the plate which had received the 90-second exposure had turned form dark green to jet black.

If, however, the same image sequence is followed but the plate is developed at 200° C. for 20 seconds, the areas which have been exposed under the second negative for 6 seconds turn sepia rather than retaining their original green.

EXAMPLE III

A photographic plate was prepared from a coating solution comprising:

|  | Parts by Weight |
| --- | --- |
| difurfurylidene pentaerythritol | 0.5 |
| iodoform | 1.5 |
| 2,5-dimethoxyaniline | 1.0 | dissolved in 60 parts of chloroform containing 10 percent by weight of polysulfone resin. The solution was applied by means of a No. 20 Mayer rod at the rate of 7.5 g./m.$^2$ to one side of paper treated with polyvinyl alcohol and titanium dioxide to repel the solvent, and dried. The plate was exposed through a transparency using a 2.25 kv.-a. carbon arc lamp at a distance of 50 cm. for 60 seconds, whereby an impermanent, green image was formed. Heat development at 205° C. for 15 seconds produced a dense, black image of excellent stability, e.g., 2 hours at 25° C. in a Fade-o-meter caused no perceptible degradation.

EXAMPLE IV

A photographic plate was prepared from a coating solution comprising 2 parts by weight 2-furyl-5-nitro-5-methyl-1,3-dioxane, 2 parts of iodoform, and 2 parts of 2,5-dimethoxyaniline dissolved in 140 parts of chloroform containing 10 percent by weight polyphenylene oxide resin (General Electric). The solution was applied by means of a No. 20 Mayer rod in an amount equal to 6 g./m.$^2$ to one side of a machine-calendered base bearing a barrier coat of polyvinyl alcohol and titanium dioxide, and dried. The plate was exposed through a transparency which contained a halftone image, using a 7.7 kv.-a. carbon arc lamp at a distance of 58 cm. for 20 seconds, whereby an impermanent, green image was formed. Heat development at 195° C. for 20 seconds produced a dense, black halftone reproduction of excellent stability.

EXAMPLE V

A photographic plate was prepared from a coating solution comprising:

|  | Parts by Weight |
| --- | --- |
| polyphenylene oxide (General Electric) | 15 |
| methylene chloride | 40 |
| trichloroethylene | 43 |
| toluene | 27 |
| difurfurylidene pentaerythritol | 2 |
| iodoform | 4 |
| 2,5-diethoxyaniline | 3 |

The solution was applied by means of a No. 16 Mayer rod in an amount equal to 5.25 g./m.$^2$ to one side of a supercalendered, barrier-coated paper base and dried. The plate was exposed through a transparency, which contained a halftone image, using a 2.25 kv.-a. carbon arc at a distance of 50 cm. for 10 seconds, whereby an impermanent, green image was formed. Heat development at 190° C. for 60 seconds produced a dense, black, halftone reproduction of excellent stability.

While the invention has been described with reference to preferred embodiments thereof, it is understood that various other changes and modifications thereof will occur to a person of ordinary skill in the art without departing from the spirit and scope of the invention, as defined by the appended claims.

What is claimed is:

1. The method of forming an image in a photographic plate which comprises, on a support, a layer of a light-passing binder containing dissolved therein: as a color former, a purified furfurylidene compound: as a sensitizer, a photosensitive lower haloalkane; and as an enhancer, a 2,5-dialkoxyaniline; said method comprising the steps of;

exposing the plate to light through an image-containing transparency, whereby an impermanent image is formed in the plate, and heating the plate to a temperature in excess of 150° C. to develop the image.

2. The method of forming a two-tone image in a photographic plate which comprises, on a support, a layer of polysulfone resin containing dissolved therein: as a color former, a purified furfurylidene compound; as a sensitizer, a photosensitive lower haloalkane; and as an enhancer, a 2,5-dialkoxyaniline; said method comprising the steps of:

exposing the plate to light through a first image-containing transparency for a time sufficient to produce a black image upon development, exposing the plate to light through a second image-containing transparency for a time whereby a green image is formed in the plate which retains its color upon development, and heating the plate to a temperature which does not greatly exceed 150° C. to develop both the black and green images.

3. A heat developable photographic plate capable of forming, after exposure to light, dense, black images at temperatures in excess of 150° C., the plate comprising, on a support, a layer of a light-passing binder containing dissolved therein: as a color former, a purified furfurylidene compound; as a sensitizer, a photosensitive lower haloalkane; and as an enhancer, a 2,5-dialkoxyaniline.

4. The plate according to claim 3 wherein the 2,5-dialkoxyaniline is 2,5-dimethoxyaniline.

5. The plate according to claim 3 wherein the 2,5-dialkoxyaniline is 2,5-diethoxyaniline.

6. The plate according to claim 3 wherein the 2,5-dialkoxyaniline is 2,5-diisopropoxyaniline.

7. The plate according to claim 3 wherein the purified furfurylidene is difurfurylidene pentaerythritol.

8. The plate according to claim 7 wherein the sensitizer is iodoform.

9. The plate according to claim 3 wherein the binder is polysulfone resin.

10. The plate according to claim 3 wherein the binder is polyphenylene oxide resin.

* * * * *